United States Patent
Sukumaran

(10) Patent No.: US 7,685,316 B2
(45) Date of Patent: Mar. 23, 2010

(54) SYSTEM AND METHOD FOR COORDINATED NETWORK CONFIGURATION

(75) Inventor: Byju Jagadhamma Sukumaran, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 951 days.

(21) Appl. No.: 11/154,213

(22) Filed: Jun. 16, 2005

(65) Prior Publication Data

US 2006/0288016 A1    Dec. 21, 2006

(51) Int. Cl.
*G06F 15/16* (2006.01)

(52) U.S. Cl. .................... 709/246; 709/218

(58) Field of Classification Search .............. 709/220, 709/227, 223, 201, 221, 203, 246; 726/15, 726/3, 11; 370/401, 392, 389, 400, 254, 370/352
See application file for complete search history.

(56) References Cited

U.S. PATENT DOCUMENTS

| 5,331,315 | A | 7/1994 | Crosette |
| 5,471,318 | A | 11/1995 | Ahuja et al. |
| 6,392,760 | B1 | 5/2002 | Ahuja et al. |
| 6,430,241 | B1 | 8/2002 | Rupprecht et al. |
| 6,684,244 | B1 | 1/2004 | Goldman et al. |
| 7,055,036 | B2 * | 5/2006 | Kouznetsov et al. ........ 713/176 |
| 7,065,562 | B2 * | 6/2006 | Courtney ................ 709/220 |
| 7,200,548 | B2 * | 4/2007 | Courtney ................ 703/27 |
| 7,365,872 | B2 * | 4/2008 | Lawrence et al. .......... 358/1.15 |
| 7,367,020 | B2 * | 4/2008 | Bickle et al. ............... 717/143 |
| 2003/0037128 | A1 * | 2/2003 | Beadles et al. ............ 709/220 |
| 2003/0101240 | A1 * | 5/2003 | Courtney ................ 709/220 |
| 2004/0078457 | A1 * | 4/2004 | Tindal ................... 709/223 |
| 2004/0221026 | A1 * | 11/2004 | Dorland ................. 709/223 |
| 2005/0021935 | A1 * | 1/2005 | Schillings et al. .......... 709/220 |
| 2005/0050516 | A1 * | 3/2005 | Mysore .................. 717/114 |
| 2005/0138147 | A1 * | 6/2005 | Bozak et al. ............. 709/220 |
| 2006/0080425 | A1 * | 4/2006 | Wood et al. .............. 709/223 |
| 2006/0101375 | A1 * | 5/2006 | Loughlin et al. .......... 717/104 |

* cited by examiner

*Primary Examiner*—Kevin Bates
*Assistant Examiner*—Benjamin R Bruckart
(74) *Attorney, Agent, or Firm*—Michael C. Stephens, Jr.; Trellis IP Law Group, PC

(57) ABSTRACT

Disclosed are device managers, systems and methods for coordinating the configurations of devices on a network. An exemplary system having devices and/or device managers in accordance with embodiments can include at least two devices coupled to a network where the devices are able to parse data in a meta or common information format, such as Extensible Markup Language (XML). The network may be a Virtual Private Network (VPN), for example. An exemplary method in accordance with embodiments can include: connecting first and second devices to a network; configuring the first device; generating the first device configuration in its native command format and the second device's configuration as meta data; applying the meta data to a suitable parser in the second device; and generating readable configuration commands to configure the second device.

24 Claims, 5 Drawing Sheets

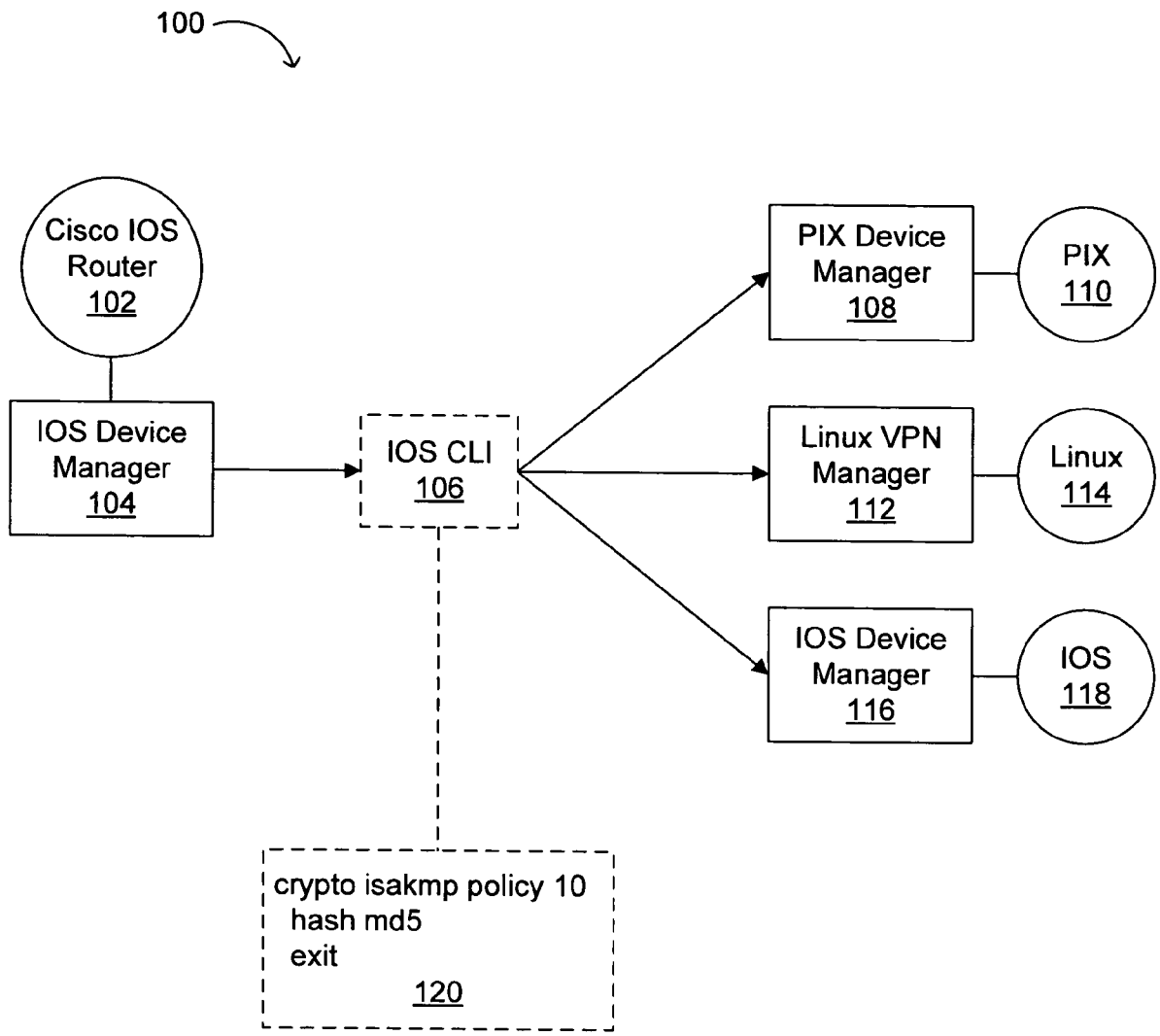
Figure 1
(conventional)

SYSTEM AND METHOD FOR COORDINATED NETWORK CONFIGURATION

BACKGROUND OF THE INVENTION

This invention is related in general to configuring devices on a network and more specifically to device managers, systems, and methods for coordinating network configurations between two or more such devices in the same or different network management domains.

In many network configurations, specific commands are required to allow different devices (e.g., routers, firewall protectors, etc.) on the network to work together. For example, in a Virtual Private Network (VPN) configuration, the devices to be included in the VPN must be configured to operate and share information with each other. Similarly, in many other networks, such as Wide Area Network (WAN) arrangements, "peer" devices need to be configured to realize a "connection." Conventionally, such configurations are done on each device in that device's native command format.

Referring now to FIG. 1, a block diagram illustrating a conventional device configuration approach is indicated by the general reference character 100. Cisco Internet Operating System (IOS) router 102 interfaces with IOS device manager 104. When Cisco IOS router 102 is configured using IOS Command Line Interface (CLI) 106, an example of which is shown in box 120, this configuration may be supplied to other devices on the same network. For example, IOS CLI 106 may be supplied to PIX device manager 108 for PIX 110 configuration, Linux VPN manager 112 for Linux 114 configuration, and IOS device manager 116 for IOS 118 configuration. However, only IOS device managers 104 and 116 understand the IOS native command format. Accordingly, PIX device manager 108 and Linux VPN manager 112 will need to be otherwise directly provided (e.g., by software programming) with commands in their native command format. Unfortunately, conventional approaches do not facilitate the sharing of configuration information to support different native command formats.

BRIEF DESCRIPTION OF THE DRAWINGS

FIG. 1 is a block diagram illustrating a conventional device configuration approach.

DETAILED DESCRIPTION OF EMBODIMENTS OF THE INVENTION

Embodiments of the present invention implement device managers, systems, and/or methods for coordinating the configurations of devices on a network. An exemplary system having devices and/or device managers in accordance with embodiments can include at least two devices coupled to a network where the devices are able to parse data in a meta or common information format, such as Extensible Markup Language (XML). The network may be a Virtual Private Network (VPN), for example. An exemplary method in accordance with embodiments can include: connecting first and second devices to a network; configuring the first device; generating the first device configuration in its native command format and the second device's configuration as meta data; applying the meta data to a suitable parser in the second device; and generating device readable (e.g., in that device's native format) configuration commands to configure the second device.

In general, any type of hardware, software or combination thereof can be used with aspects of embodiments of the invention. Further, any type of network and/or communication link can be used. Also, any type of meta data or common information format configuration commands may be used with aspects of embodiments of the invention.

For clarity, various well-known components, such as power supplies, communications ports, routers, gateways, firewalls, and so on, have been omitted from the figures. However, those skilled in the art with access to the present teachings will know which components to implement and how to implement them to meet the needs of a given application.

Figure 2:
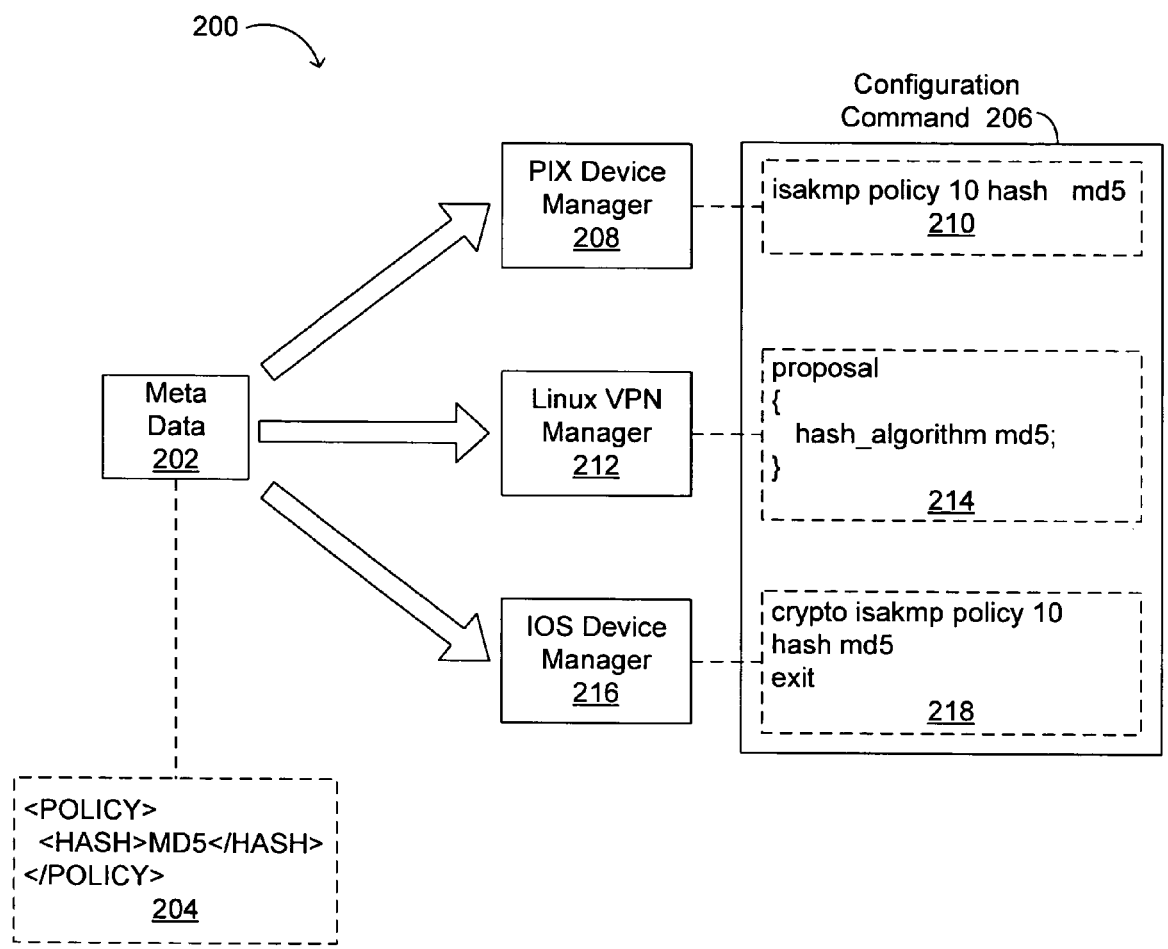
FIG. 2 is a block diagram illustrating an exemplary meta data usage to coordinate device configurations in accordance with an embodiment of the present invention.

Referring now to FIG. 2, a block diagram illustrating an exemplary meta data usage to coordinate device configurations in accordance with an embodiment of the present invention is indicated by the general reference character 200. A device may be any network component, such as a router, switch, and/or firewall, as just a few examples. Meta data 202 can include the code shown in box 204, for example. Meta data 202 can be supplied, either manually or in an automated fashion (e.g., sent via automatic e-mail or Remote Copy Protocol (RCP)) to PIX device manager 208, Linux VPN manager 212, and IOS device manager 216. Such device managers can include software that is used to configure the associated devices. Each device manager can take (i.e., import) the common information format or meta data 202 configuration information and convert that information to the appropriate native command format. Further, the importation and/or conversion of meta data 202 may be initiated automatically in some embodiments. In other embodiments, an administrator may double-click on the meta data file in order to start the conversion process.

Such a conversion process may be accomplished by any suitable parser that can read the common information format. Configuration command 206 shows the native command format syntax corresponding to each device manager in example 200. For example, box 210 shows the native command format version of code 204 for PIX device manager 208. Box 214 shows the native command format version of code 204 for Linux VPN manager 212. Similarly, box 218 shows the native command format version of code 204 for IOS device manager 216.

Figure 3:
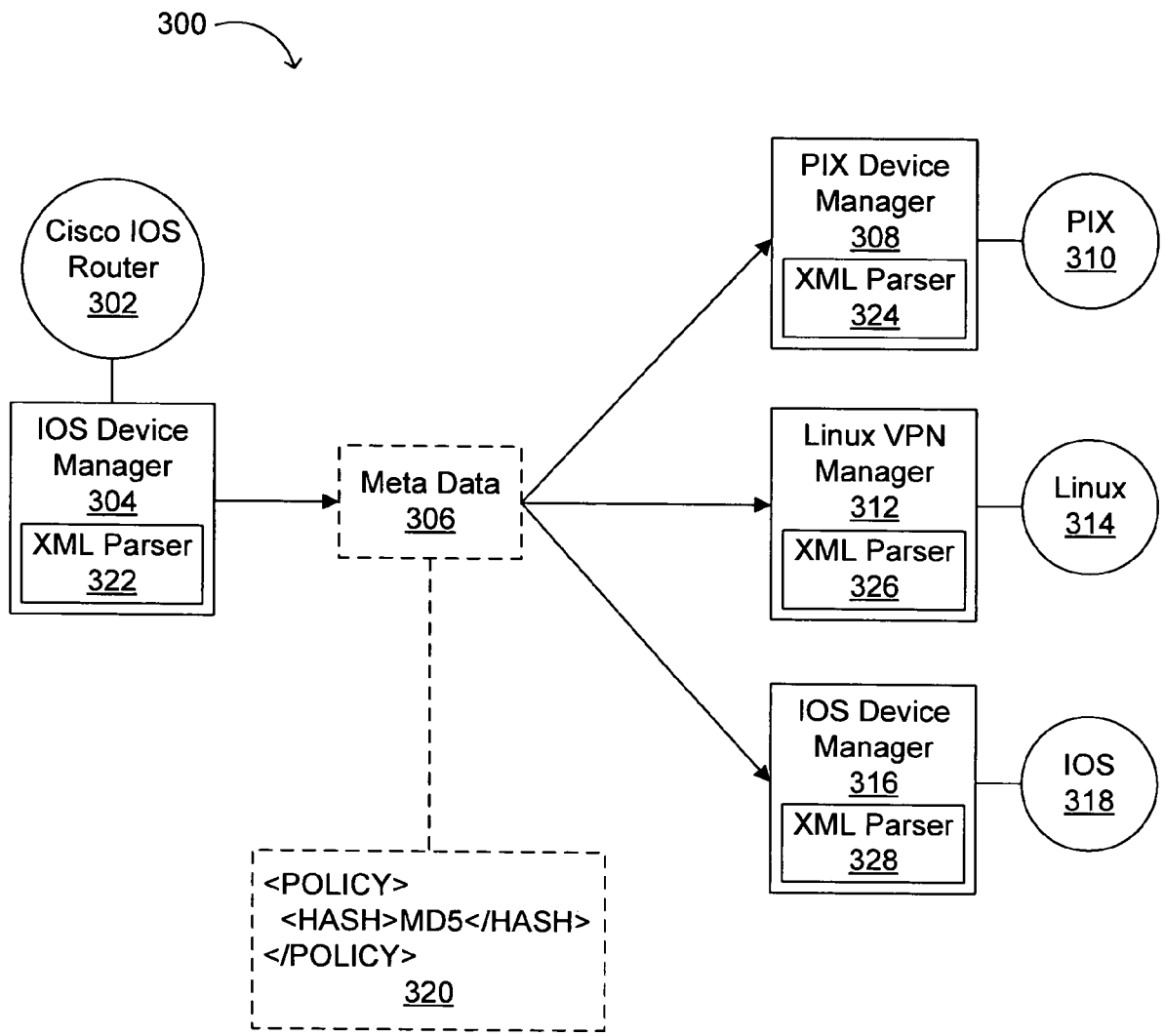
FIG. 3 is a block diagram illustrating an exemplary system utilizing meta data to coordinate device configurations in accordance with an embodiment of the present invention.

Referring now to FIG. 3, a block diagram illustrating an exemplary system utilizing meta data to coordinate device configurations in accordance with an embodiment of the present invention is indicated by the general reference character 300. Cisco IOS router 302 can interface with IOS device manager 304, which may be a security device manager (SDM) or a router management console (MC), for example. Cisco IOS router 302 may be configured via IOS device manager 304 using its native command format (e.g., IOS CLI). According to embodiments of the present invention, a common information format version (e.g., meta data 306) of the configuration made via IOS device manager 304 may also be generated and supplied to other device managers to facilitate coordinated configuration.

In this example 300, meta data 306 may be in Extensible Markup Language (XML) common information format. An example of XML meta data 306 is shown in box 320. This configuration in meta data format (e.g., XML) may be propagated to other devices via their associated device managers on the same network. For example, meta data 306 may be supplied to PIX device manager 308 for PIX 310 configuration, Linux VPN manager 312 for Linux 314 configuration, and IOS device manager 316 for IOS 318 configuration. Further, IOS device manager 304 may represent one management domain and one or more of PIX device manager 308, Linux VPN manager 312, and IOS device manager 316 may represent another management domain. Embodiments of the present invention can allow for coordinated configuration across two or more management domains.

According to embodiments, each device manager may be equipped with an XML parser (e.g., XML parser 322) in order to read the XML and convert it to the appropriate native command format version. For example, XML parser 324 may be included in or associated with PIX device manager 308 in order to convert meta data 306 (e.g., the code in box 320) into the native command format readable by PIX 310 (e.g., the code in box 210 of FIG. 2). Similarly, XML parser 326 may be included in or associated with Linux VPN manager 312 in order to convert meta data 306 (e.g., the code in box 320) into the native command format readable by Linux 314 (e.g., the code in box 214 of FIG. 2). Also, XML parser 328 may be included in or associated with IOS device manager 316 in order to convert meta data 306 (e.g., the code in box 320) into the native command format readable by IOS 318 (e.g., the code in box 218 of FIG. 2).

In this fashion, semantically identical (i.e., commands having the same effect) configurations may be exported from one device manager (e.g., IOS device manager 304) and imported to another device manager (e.g., PIX device manager 308, Linux VPN manager 312, and/or IOS device manager 316). Accordingly, embodiments of the present invention can facilitate end-to-end configuration between devices which are syntactically (i.e., different native command formats) different. In some embodiments, as discussed above, an XML-based standard file format based on the semantics of a configuration may be used as the common information format. All associated device managers can then parse such an XML file and generate the appropriate configuration in a format that is native to that particular device manager.

Figure 4:
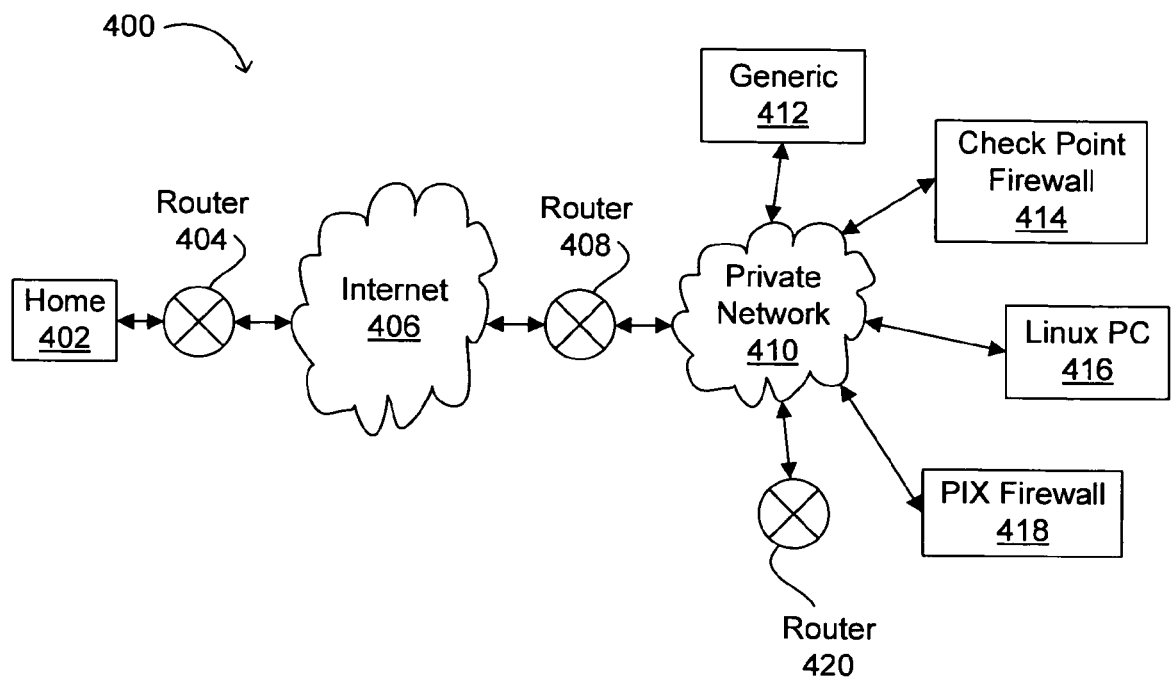
FIG. 4 is a block diagram illustrating an exemplary Virtual Private Network (VPN) system utilizing meta data to coordinate device configurations in accordance with an embodiment of the present invention.

Referring now to FIG. 4, a block diagram illustrating an exemplary Virtual Private Network (VPN) system utilizing meta data to coordinate device configurations in accordance with an embodiment of the present invention is indicated by the general reference character 400. In this particular example, a public network (e.g., Internet 406) may be utilized in conjunction with a private network (410) in the formation of a VPN. Home 402 may represent a home personal computer (PC) and this computer may be coupled to Internet 406 via router 404. Router 408 may couple Internet 406 with private network 410. Interfacing with private network 410 may be a generic device 412, check point firewall 414, Linux PC 416, PIX firewall 418, and router 420, for example.

According to embodiments, meta data may be used to coordinate a VPN configuration between two or more of the devices shown in example 400. For example, if packets are to be encrypted over Internet 406 so that a secure connection (e.g., using a secure IP protocol, such as IPSec) is made between router 404 and router 408, embodiments of the present invention may be used to coordinate the configurations of routers 404 and 408.

In certain cases, such as the exemplary VPN configuration of FIG. 4, a "mirror" configuration may be employed. In a mirror configuration, the configuration at one peer (e.g., router 404) should be synchronized with or essentially be a mirror image of the other peer (e.g., router 408). According to embodiments of the present invention, mirror type configurations involving two or more peers can be facilitated by using meta data to coordinate the configurations. Of course, in some specific cases where both devices are alike (e.g., they understand the same native command format, such as where both devices are IOS routers), configuration form one device to another can be exported in the native command format. Embodiments of the present invention may be particularly useful where the peer devices are not identical, are made by different manufacturers, or otherwise do not understand the same native command format. Accordingly, if routers 404 and 408 are made by different manufacturers or understand different native command formats, embodiments of the present invention may be especially useful in coordinating a common configuration between routers 404 and 408.

Figure 5:
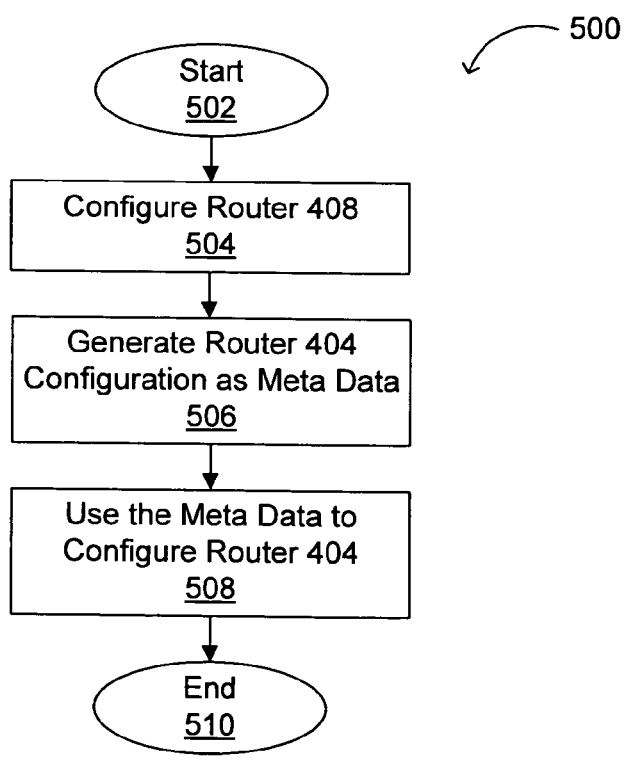
FIG. 5 is a flow diagram illustrating a router configuration process for the exemplary arrangement of FIG. 4.

Referring now to FIG. 5, a flow diagram illustrating a router configuration process for the exemplary arrangement of FIG. 4 is indicated by the general reference character 500. The flow can begin (502) and router 408 may be configured (504) using the native command format of router 408. Either automatically or in response to a manual request during the configuration of router 408, this configuration may be generated in a native command format. Substantially during this time, router 404's configuration may be generated in a common information format as meta data (506). Further, router 408 may learn (e.g., during the router 408 configuration) of any of its peer devices (e.g., router 404) so as to include such peer device configuration information in the meta data. Such an approach is suitable for "mirrored" or other peer device arrangements. In some other arrangements, a more generic (e.g., not directed to a particular device or set of peers) meta data file may be provided, for example. The meta data may then be used to configure router 404 (508) and the flow can complete (510). As discussed above, in one embodiment, the meta data may be in XML and may be converted into the appropriate native command format using an XML parser. In this fashion, a "connection" between routers 404 and 408 may be formed to facilitate a VPN.

In some applications, the XML parsers for different device managers in a system or network arrangement may not be equipped to understand the full range of available commands. Certain command extensions may not be used with each such device manager. In these applications, the usable or understood subset of commands that each XML parser is able to handle may be considered. The situation is akin to different people talking in a common language, but each not having the exact same vocabulary. Accordingly, they will understand each other based on the common vocabulary. As XML parsers are updated to accommodate increased features and the like, some commands may not be fully understood by one or more of the device managers, giving rise to this situation. However, according to aspects of embodiments of the present invention, signature files similar to those used to update virus protection software can also be used to provide updated XML parser version information. As a result, each device manager in the system may have the most up to date and complete XML parser so that each understands the full range of commands currently available in the common information format. Such updates of the various XML parsers can occur substantially simultaneously, which can allow for effective relatively large system deployments. Another application that can be used is to easily update a WAN configuration by re-using a prior defined meta file and changing only those parameters that need new values.

Figure 6:
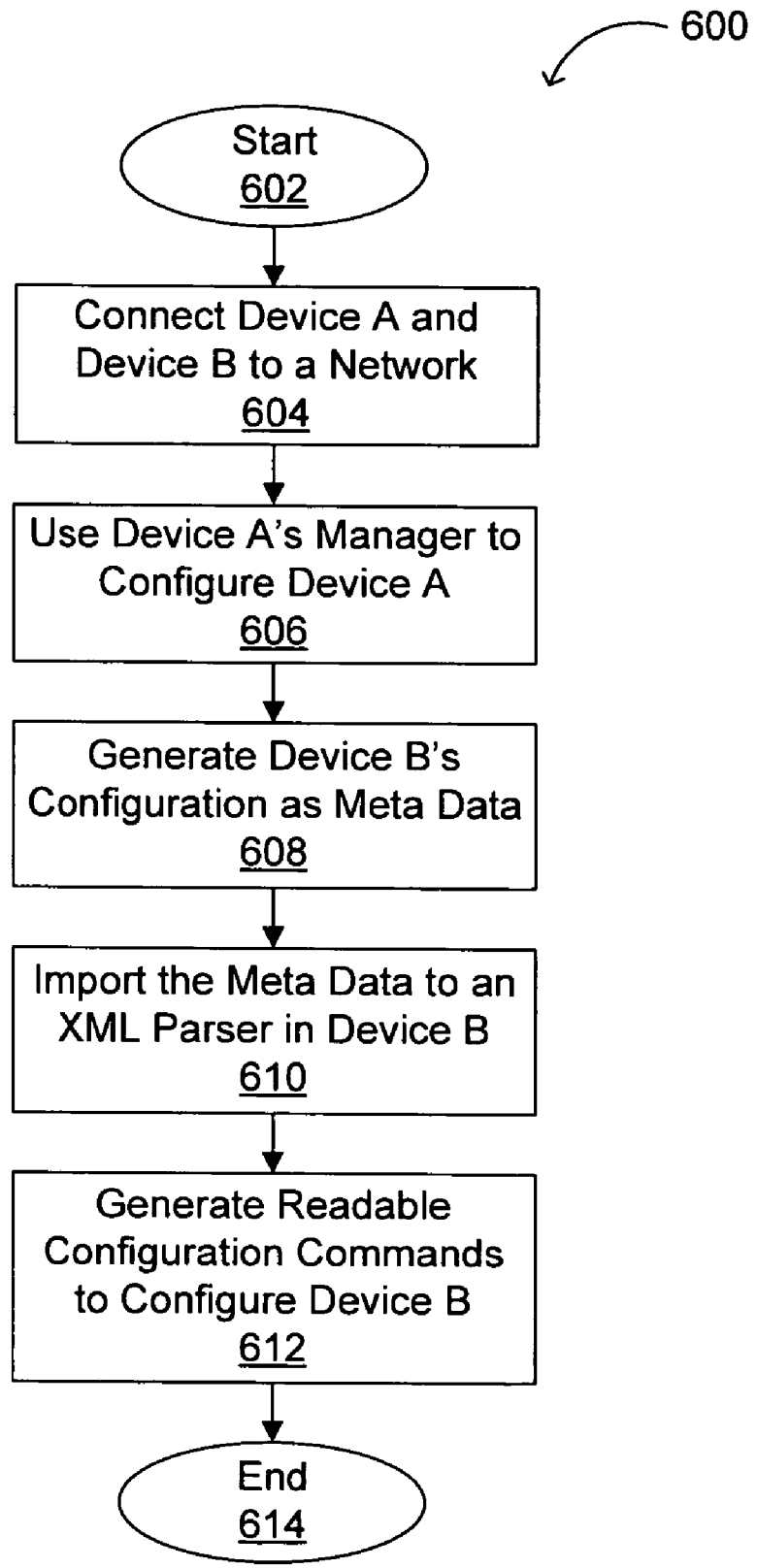
FIG. 6 is a flow diagram illustrating an exemplary meta data usage process of coordinating device configurations in accordance with an embodiment of the present invention.

Referring now to FIG. 6, a flow diagram illustrating an exemplary meta data usage process of coordinating device configurations in accordance with an embodiment of the present invention is indicated by the general reference character 600. The flow can begin (602) and devices A and B may be connected to a network (604). Devices A and B may be different types of devices, such as device A may be PIX and device B may be IOS or Linux, for example. Device A's manager may be used to configure device A in the native command format readable by device A (606). The configuration of device B may then be generated as meta data (608). As discussed above, in certain arrangements and/or applications, device B information may be supplied to device A during the configuration of device A (e.g., during 606). In other arrangements, a more generic (e.g., not directed to a particular device or set of peers) meta data file may be provided. The meta data may be supplied or imported to an XML or other common information format parser in device B (610). Then, configuration commands readable by device B (e.g., syntactically correct for device B) may be generated so that device B can be configured in the native command format of device B (612) and the flow can complete (614). One or more of the steps in the flow can be performed in an automatic fashion. For example, the meta data (608) may be generated automatically upon configuration of device A's meta data (606). Similarly, other steps may be performed in an automated or manual fashion.

Table 1 below shows an exemplary XML-based meta file that may be used in accordance with embodiments of the present invention.

TABLE 1

```
<GENIE>
    <PEER>172.28.54.241</PEER>
    <LOCAL>172.23.59.219</LOCAL>
    <AUTH>
<KEY>test</KEY>
    </AUTH>
    <ISAKMPPOLICIES>
    <ISAKMP>
        <AUTHENTICATION>PRE_SHARE</AUTHENTICATION>
        <ENCRYPTION>DES</ENCRYPTION>
        <HASH>MD5</HASH>
        <DHGROUP>group2</DHGROUP>
<LIFETIME>86400</LIFETIME>
    </ISAKMP>
    <ISAKMP>
        <AUTHENTICATION>PRE_SHARE</AUTHENTICATION>
        <ENCRYPTION>3DES</ENCRYPTION>
        <HASH>SHA_1</HASH>
        <DHGROUP>group2</DHGROUP>
<LIFETIME>86400</LIFETIME>
    </ISAKMP>
    </ISAKMPPOLICIES>
    <TFS>
    <TFESP>
        <TFINTEGRITY>ESP_SHA_HMAC</TFINTEGRITY>
<TFENCRYPTION>ESP_3DES</TFENCRYPTION>
    </TFESP>
        <TFMODE>TUNNEL</TFMODE>
<TFCOMPR>N</TFCOMPR>
    </TFS>
    <TRAFFIC>
    <NETWORK>
        <SRC>10.10.10.10\255.255.255.0</SRC>
<DEST>20.20.20.0\255.255.255.0</DEST>
    </NETWORK>
```

TABLE 1-continued

```
</TRAFFIC>
</GENIE>
```

Table 2 below shows an exemplary native command format for an IOS router generated in response to the XML meta data of Table 1 that may be used in accordance with embodiments of the present invention.

TABLE 2

```
access-list 104 remark SDM_ACL Category=4
access-list 104 remark IPSec Rule
access-list 104 permit ip 20.20.20.0 0.0.0.255
10.10.10.10 0.0.0.255
crypto isakmp policy 6
    authentication pre-share
    encr 3des
    hash sha
    group 2
    lifetime 86400
    exit
crypto isakmp policy 5
    authentication pre-share
    encr des
    hash md5
    group 2
    lifetime 86400
    exit
crypto isakmp key test address 172.23.59.219
crypto ipsec transform-set SDM_TRANSFORMSET_2
esp-sha-hmac esp-3des
    mode tunnel
    exit
crypto map SDM_CMAP_4 1 ipsec-isakmp
    set transform-set SDM_TRANSFORMSET_2
    set peer 172.23.59.219
    match address 104
    set security-association lifetime seconds 3600
    set security-association lifetime kilobytes 4608000
    exit
! IP address / user account command
interface FastEthernet0/0
    no crypto map
    crypto map SDM_CMAP_4
    exit
```

Table 3 below shows an exemplary native command format for a PIX firewall device manager generated in response to the XML meta data of Table 1 that may be used in accordance with embodiments of the present invention.

TABLE 3

```
access-list inside_nat0_inbound line 1 extended
permit ip 10.10.10.0
10.10.10.10 20.20.20.0 20.20.20.0
nat (inside) 0 access-list inside_nat0_inbound outside
isakmp enable inside
tunnel-group vpnconn type ipsec-l21
tunnel-group vpnconn ipsec-attributes
    pre-shared-key test
    isakmp keepalive threshold 10 retry 2
isakmp policy 30 authen PRE_SHARE
isakmp policy 30 encrypt des
isakmp policy 30 hash md5
isakmp policy 30 group 2
isakmp policy 30 lifetime 86400
isakmp policy 50 authen PRE_SHARE
isakmp policy 50 encrypt 3des
isakmp policy 50 hash sha_1
isakmp policy 50 group 2
isakmp policy 50 lifetime 86400
access-list inside_cryptomap_20 extended permit ip
10.10.10.0 10.10.10.10
```

TABLE 3-continued

```
20.20.20.0 20.20.20.0
crypto map inside_map 20 set connection-type bidirectional
crypto map inside_map 20 set peer 172.28.54.241
crypto map inside_map 20 match address inside_cryptomap_20
crypto map inside_map 20 set transform-set ESP-3DES-SHA
crypto map inside_map 20 set security-association
  lifetime seconds 28800
  kilobytes 4608000
no crypto map inside_map 20 set nat-t-disable
no crypto map inside_map 20 set reverse-route
crypto map inside_map 20 set phase1-mode main
crypto map inside_map 20 set inheritance rule
crypto map inside_map interface inside
```

While embodiments herein have been discussed with reference to XML meta data, embodiments of the present invention are not limited thereto. For example, many other types of common information formats and associated parsers may be used in accordance with embodiments of the present invention. Further, specific network arrangements and configurations shown herein are merely exemplary and one skilled in the art will recognize that other variations may be used in accordance with embodiments. Accordingly, variations and embodiments other than those discussed herein are possible.

Although embodiments of the invention are discussed primarily with reference to specific examples, any acceptable architecture, topology, protocols, network arrangement, common information format, native command format, or other network and/or digital processing features can be employed. In general, network controllers, managers, access points, clients, and so on, can be implemented via any device with processing ability or other requisite functionality. It is also possible that functionality relevant to embodiments of the present invention can be included in a router, switch and/or other integrated device.

A management domain can be defined by ownership, management or control of network devices or other resources by a person or other entity (e.g., company, organization, group, etc.). Management domains can be also be defined by network properties, such as a management domain that includes network resources that are behind a firewall, serviced by a server, router switch, etc. A management domain can further be defined by protocols, or other standards that are implemented within a domain; by applications executing within a domain, network topology, or other characteristics. Configuration of a domain can include automated or manual steps and can be, e.g., one-to-many, many-to-many, or use other distribution schemes.

Although processes of the present invention, and the hardware executing the processes, may be characterized by language common to a discussion of the Internet (e.g., "client," "server," "peer") it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a device suitable for a network connection. For example, portable computing devices such as a personal digital assistant (PDA), cell phone, laptop computer, or other devices can be employed. In general, the devices and manner of specific processing (including location and timing) are not critical to practicing important features of embodiments of the present invention.

Although embodiments of the present invention have been discussed primarily with respect to configuration information associated with a network, such as the Internet, any suitable network, network topology, transmission protocols, sender-receiver devices and relationships, and other characteristics or properties of electronic devices, processes and transmission methods can be used. For example, features of the invention can be employed on various scales and in various applications, including local area networks (LANs), campus or corporate networks, home networks, etc.

Although the invention has been discussed with respect to specific embodiments thereof, these embodiments are merely illustrative, and not restrictive, of the invention. Embodiments of the present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data, may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A device manager adapted to coordinate configuration information across first and second management domains, the device manager comprising:
   a computer processor; and
   a computer-readable storage medium having one or more instructions encoded thereon, the one or more instructions being executable by the computer processor, and when executed operable to:
      receive from a network using an automated messaging protocol, configuration information from the first management domain in a first format, the configuration information being supplied via the automated messaging protocol to a plurality of device managers, wherein the first format comprises extensible markup language (XML) meta data, the first management domain having a first device, the configuration information being for configuring a feature on the first device;
      convert the configuration information to a second format using an XML parser, wherein the received configuration information in the first format and the converted configuration information in the second format are semantically identical, the XML parser being updated via a signature file such that the XML parser understands an updated list of commands for the configuration information, the signature file update considering subsets of commands that are understood by different XML parsers and a full range of available commands for the configuration information;
      send the converted configuration information in the second format to a second device managed by the device manager, the second format being readable by the second device, the second device being in the second management domain; and
      access the configuration information in the second format in the second device to configure the feature on the second device such that a mirrored configuration of the feature is formed on the first and the second devices, the first and second devices having different native command formats.

2. The device manager of claim 1, wherein the network comprises a public network, and the second device is accessible via a virtual private network (VPN).

3. The device manager of claim 1, wherein the instructions when executed are further operable to update the XML parser using a signature file.

4. The device manager of claim 1, wherein the second format includes a native command format for the second device, the first and second devices having different manufacturers.

5. The device manager of claim 1, wherein the second device comprises an Internet Operating System (IOS) router.

6. A device manager adapted for configuration coordination across first and second management domains, the device manager comprising:
- a computer processor; and
- a computer-readable storage medium having one or more instructions encoded thereon, the one or more instructions being executable by the computer processor, and when executed operable to:
  - receive configuration information in a first format, the first format being readable by a first device associated with the device manager, the first device being in the first management domain, the configuration information being for configuring a feature on the first device;
  - convert the configuration information using an extensible markup language (XML) parser to a second format, wherein the received configuration information in the first format and the converted configuration information in the second format are semantically identical, the XML parser being updated via a signature file such that the XML parser understands an updated list of commands for the configuration information, the signature file update considering subsets of commands that are understood by different XML parsers and a full range of available commands for the configuration information; and
  - send the configuration information in the second format over a network to the second management domain using an automated messaging protocol, the configuration information being supplied via the automated messaging protocol to a plurality of device managers, wherein the second format comprises XML meta data, the configuration information being used to configure the feature on a second device in the second management domain such that a mirrored configuration of the feature is formed on the first and the second devices, the first and second devices having different native command formats.

7. The device manager of claim 6, wherein the first device is accessible via a virtual private network (VPN), and the network comprises a public network.

8. The device manager of claim 6, wherein the instructions when executed are further operable to update the XML parser using a signature file.

9. The device manager of claim 6, wherein the first format includes a native command format for the first device, the first and second devices having different manufacturers.

10. A method for coordinating configuration information across first and second management domains, the method comprising:
- receiving from a network using an automated messaging protocol, configuration information from the first management domain in a first format, the configuration information being supplied via the automated messaging protocol to a plurality of device managers, wherein the first format comprises extensible markup language (XML) meta data, the first management domain having a first device, the configuration information being for configuring a feature on the first device;
- converting the configuration information to a second format using an XML parser, wherein the received configuration information in the first format and the converted configuration information in the second format are semantically identical, the XML parser being updated via a signature file such that the XML parser understands an updated list of commands for the configuration information, the signature file update considering subsets of commands that are understood by different XML parsers and a full range of available commands for the configuration information;
- sending the converted configuration information in the second format to a second device managed by a device manager, the second format being readable by the second device, the second device being in the second management domain; and
- accessing the configuration information in the second format in the second device to configure the feature on the second device such that a mirrored configuration of the feature is formed on the first and the second devices, the first and second devices having different native command formats.

11. The method of claim 10, wherein the network comprises a public network, and the second device is accessible via a virtual private network (VPN).

12. The method of claim 10, wherein the second format includes a native command format for the second device, the first and second devices having different manufacturers.

13. The method of claim 10, further comprising updating the XML parser using a signature file.

14. A method for coordinating configuration information across first and second management domains, the method comprising:
- receiving configuration information in a first format, the first format being readable by a first device associated with a device manager, the first device being in the first management domain, the configuration information being for configuring a feature on the first device;
- converting the configuration information to a second format using an extensible markup language (XML) parser, wherein the second format comprises XML meta data, wherein the received configuration information in the first format and the converted configuration information in the second format are semantically identical, the XML parser being updated via a signature file such that the XML parser understands an updated list of commands for the configuration information, the signature file update considering subsets of commands that are understood by different XML parsers and a full range of available commands for the configuration information; and
- sending the configuration information in the second format over a network to the second management domain using an automated messaging protocol, the configuration information being supplied via the automated messaging protocol to a plurality of device managers, the configuration information being used to configure the feature on a second device in the second management domain such that a mirrored configuration of the feature is formed on the first and the second devices, the first and second devices having different native command formats.

15. The method of claim 14, wherein the first device is accessible via a virtual private network (VPN), and the network comprises a public network.

16. The method of claim 14, further comprising updating the XML parser using a signature file.

17. A system, comprising:

a first device coupled to first and second networks, the first device operating in a first management domain and receiving configuration information in a first format from the first network, the first format being readable by the first device, the first device converting the configuration information to a second format using a first extensible markup language (XML) parser, wherein the second format comprises XML meta data, the first device sending the configuration information in the second format over the second network using an automated messaging protocol, the configuration information being used to configure a feature on the first device; and a second device coupled to the second and a third network, the second device operating in a second management domain, the second device receiving from the second network, the configuration information from the first device in the second format using the automated messaging protocol, the second device converting the configuration information to a third format using a second XML parser, the third format being readable by the second device to configure the feature on the second device in the second management domain such that a mirrored configuration of the feature is formed on the first and the second devices, the first and second devices having different native command formats, the first and second XML parsers being updated via a signature file such that the first and second XML parsers each understand an updated list of commands for the configuration information, the signature file update considering subsets of commands that are understood by different XML parsers and a full range of available commands for the configuration information.

18. The system of claim 17, wherein the first and third networks each comprise a virtual private network (VPN).

19. The system of claim 18, wherein the second network comprises a public network.

20. The system of claim 17, wherein the first and second XML parsers are updated substantially simultaneously using a signature file.

21. The system of claim 17, wherein at least one of the first and second devices comprises an Internet Operating System (IOS) router.

22. The system of claim 17, wherein each of the first and third formats includes a native command format.

23. An apparatus for coordinating configuration information across first and second management domains, the apparatus comprising:

hardware means for receiving from a network using an automated messaging protocol, configuration information from the first management domain in a first format, the configuration information being supplied via the automated messaging protocol to a plurality of device managers, wherein the first format comprises extensible markup language (XML) meta data, the first management domain having a first device, the configuration information being for configuring a feature on the first device;

hardware means for converting the configuration information to a second format using an XML parser, wherein the received configuration information in the first format and the converted configuration information in the second format are semantically identical, the XML parser being updated via a signature file such that the XML parser understands an updated list of commands for the configuration information, the signature file update considering subsets of commands that are understood by different XML parsers and a full range of available commands for the configuration information;

hardware means for sending the converted configuration information in the second format to a second device managed by a device manager, the second format being readable by the second device, the second device being in the second management domain; and hardware means for accessing the configuration information in the second format in the second device to configure the feature on the second device such that a mirrored configuration of the feature is formed on the first and the second devices, the first and second devices having different native command formats.

24. An apparatus for coordinating configuration information across first and second management domains, the apparatus comprising:

hardware means for receiving configuration information in a first format, the first format being readable by a first device associated with a device manager, the first device being in the first management domain, the configuration information being for configuring a feature on the first device;

hardware means for converting the configuration information to a second format using an extensible markup language (XML) parser, wherein the second format comprises XML meta data, wherein the received configuration information in the first format and the converted configuration information in the second format are semantically identical, the XML parser being updated via a signature file such that the XML parser understands an updated list of commands for the configuration information, the signature file update considering subsets of commands that are understood by different XML parsers and a full range of available commands for the configuration information; and hardware means for sending the configuration information in the second format over a network to the second management domain using an automated messaging protocol, the configuration information being supplied via the automated messaging protocol to a plurality of device managers, the configuration information being used to configure the feature on a second device in the second management domain such that a mirrored configuration of the feature is formed on the first and the second devices, the first and second devices having different native command formats.

* * * * *